US008229658B1

(12) United States Patent
Dabell

(10) Patent No.: US 8,229,658 B1
(45) Date of Patent: Jul. 24, 2012

(54) METHOD AND APPARATUS FOR PREDICTING LOCATIONS AND SCHEDULES OF LAW ENFORCEMENT TRAFFIC PATROLS

(76) Inventor: Steve Dabell, Spokane, WA (US)

( * ) Notice: Subject to any disclaimer, the term of this patent is extended or adjusted under 35 U.S.C. 154(b) by 376 days.

(21) Appl. No.: 12/657,651

(22) Filed: Jan. 25, 2010

Related U.S. Application Data

(60) Provisional application No. 61/205,741, filed on Jan. 24, 2009.

(51) Int. Cl.
*G06F 19/00* (2006.01)

(52) U.S. Cl. .......................................................... 701/117

(58) Field of Classification Search .................. 701/117, 701/118, 119
See application file for complete search history.

(56) References Cited

U.S. PATENT DOCUMENTS

| | | | | |
|---|---|---|---|---|
| 7,912,628 | B2 * | 3/2011 | Chapman et al. | 701/117 |
| 8,031,062 | B2 * | 10/2011 | Smith | 340/438 |
| 8,090,524 | B2 * | 1/2012 | Chapman et al. | 701/117 |
| 2007/0208498 | A1 * | 9/2007 | Barker et al. | 701/117 |
| 2007/0208501 | A1 * | 9/2007 | Downs et al. | 701/119 |
| 2011/0029224 | A1 * | 2/2011 | Chapman et al. | 701/118 |
| 2011/0112747 | A1 * | 5/2011 | Downs et al. | 701/118 |
| 2011/0137545 | A1 * | 6/2011 | Downs et al. | 701/119 |
| 2012/0035839 | A1 * | 2/2012 | Stehle et al. | 701/117 |
| 2012/0072096 | A1 * | 3/2012 | Chapman et al. | 701/118 |

* cited by examiner

*Primary Examiner* — Faye M. Fleming

(57) ABSTRACT

It is an object of the present invention to provide a predictive traffic law enforcement profiler apparatus and method which incorporates a means to determine current location, date and time, speed and also incorporates a means to utilize a database of historic traffic law enforcement and historical traffic data and also incorporates a predictive processing means to statistically predict likely patrol locations and schedules of traffic law enforcement and traffic hazards and a means to provide this information to the driver. It is yet another object of the present invention to provide a predictive parking meter law enforcement profiler apparatus which further includes a means to utilize a database of historical parking law enforcement citations to statistically profile parking law enforcement to predict patrol locations, schedules, and intervals.

21 Claims, 5 Drawing Sheets

Block diagram of predictive traffic law enforcement profiler apparatus

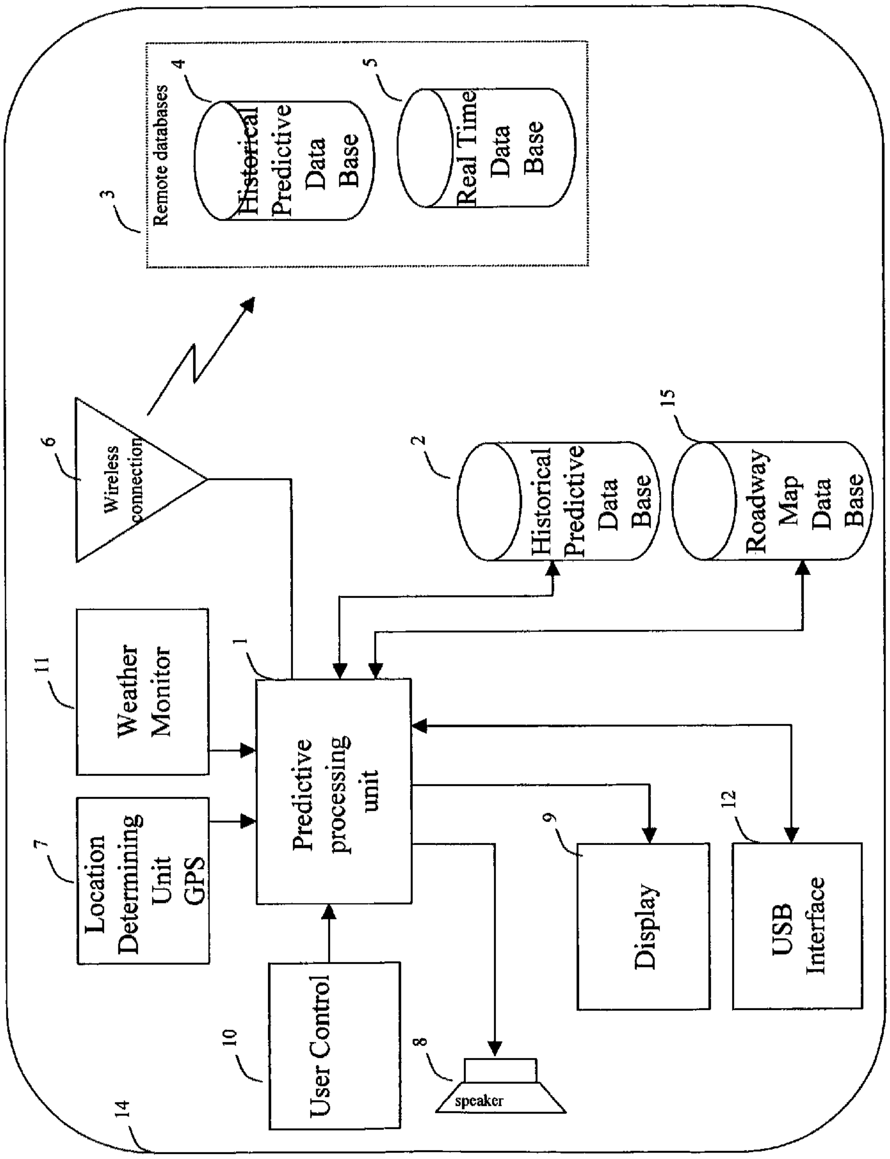
Figure 1. Block diagram of predictive traffic law enforcement profiler apparatus

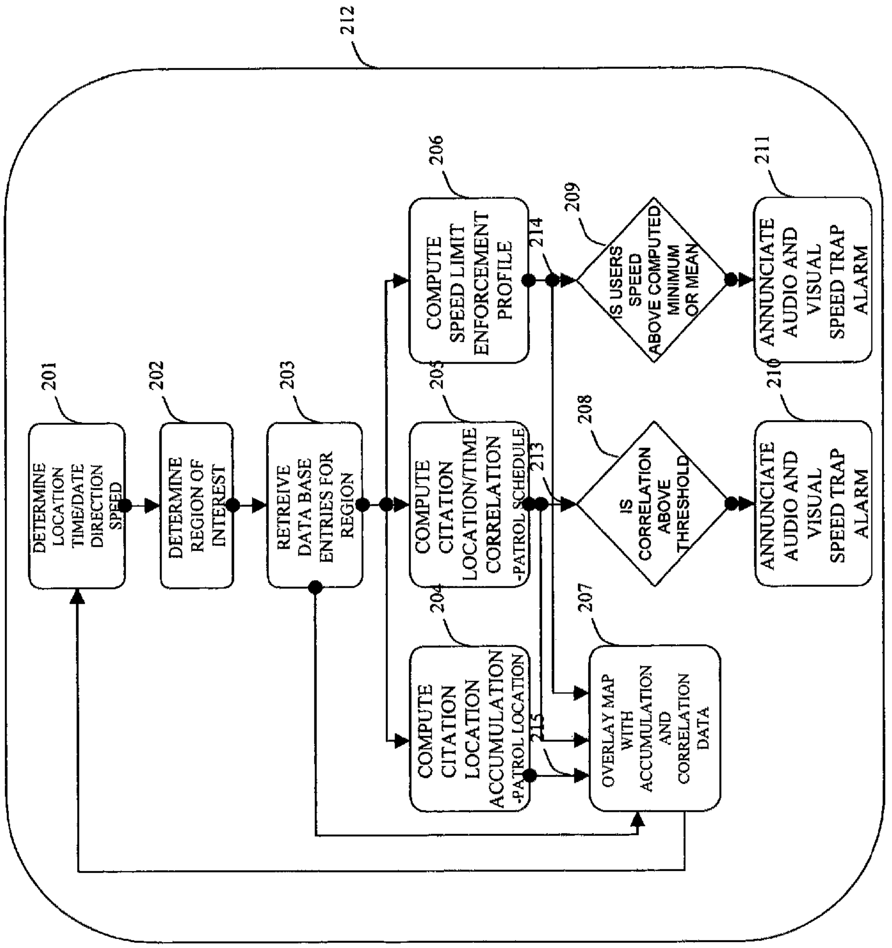
Figure 2. Method for profiling speeding violation traffic law enforcement

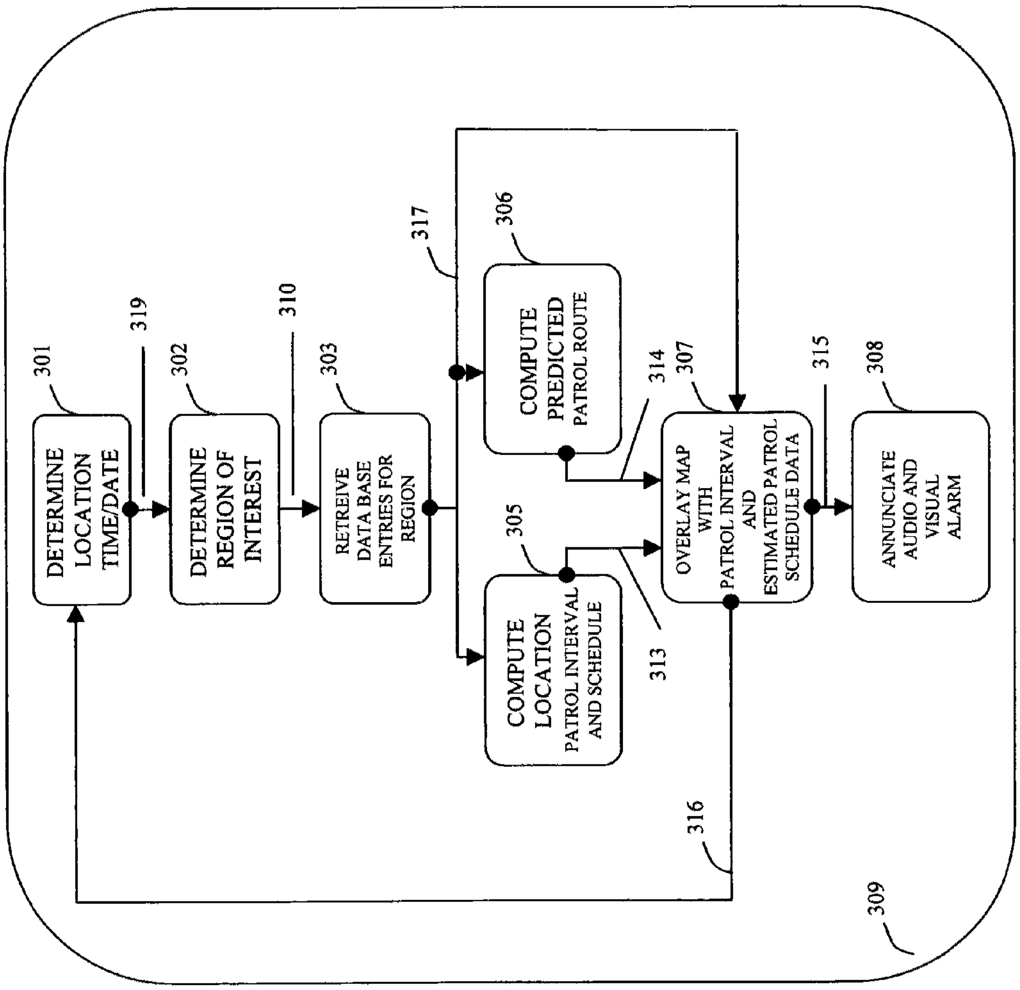
Figure 3. Method for profiling parking violation law enforcement

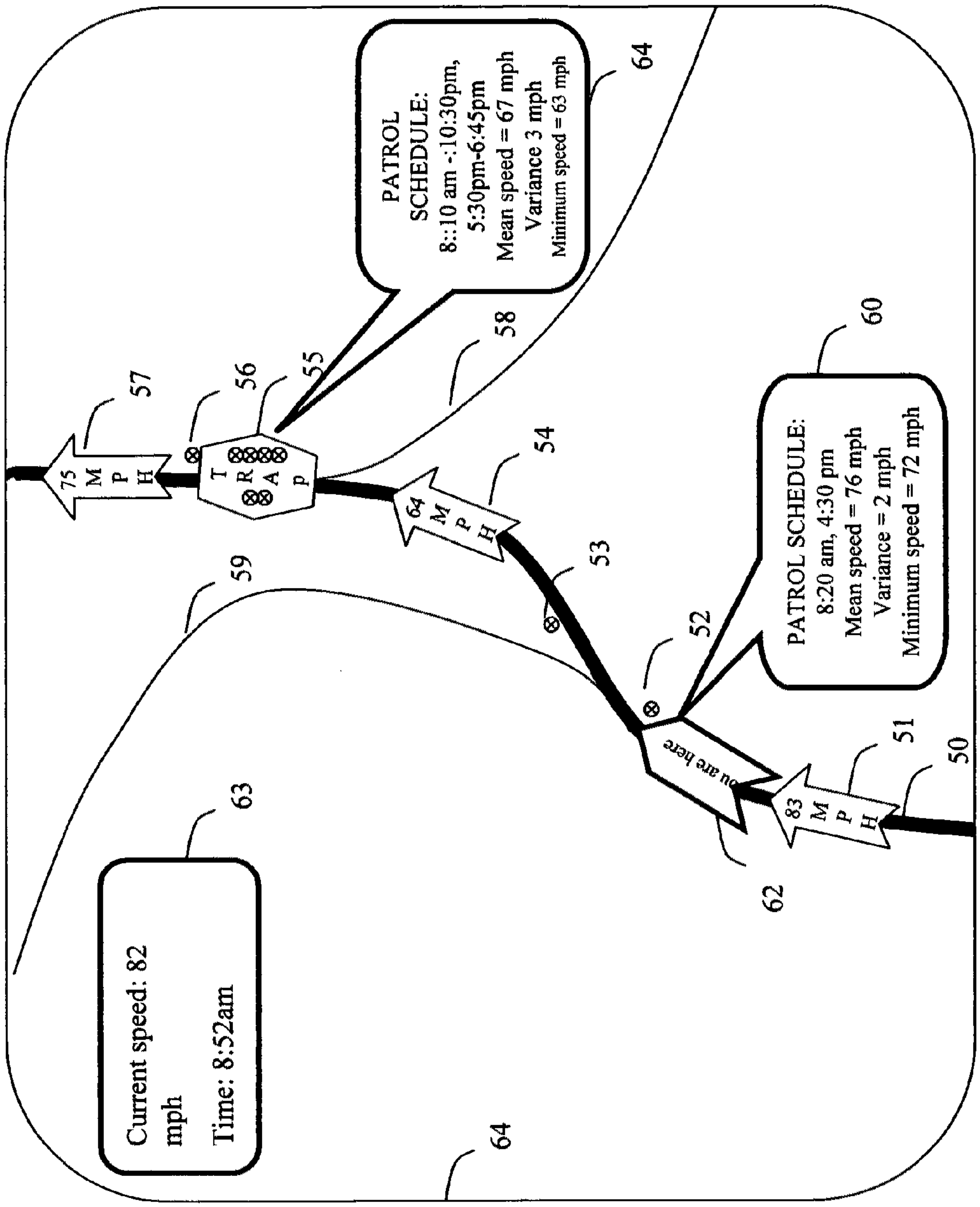
Figure 4. Example display for profiling speed limit violation law enforcement

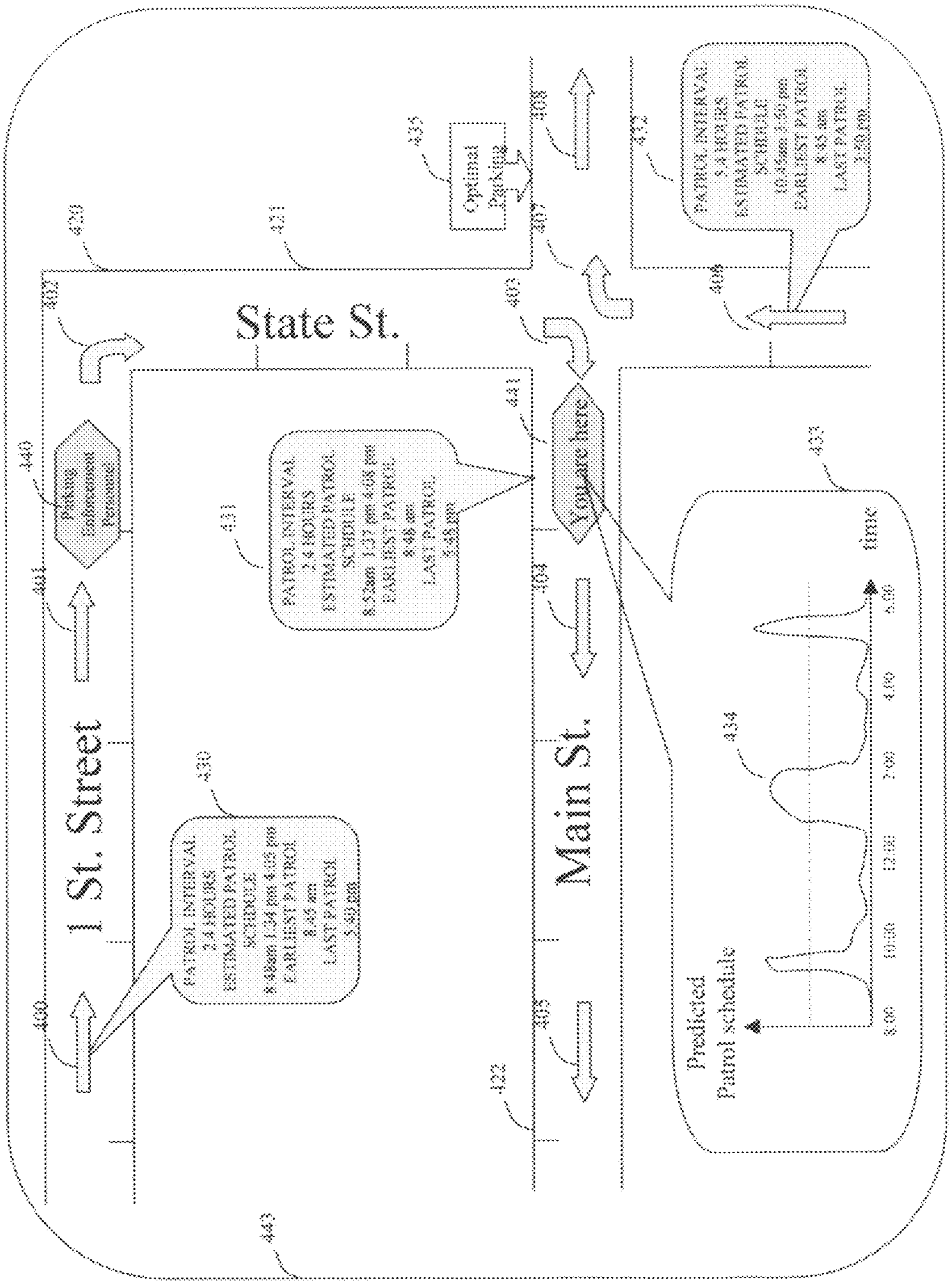
Figure 5. Example display for profiling parking violation law enforcement

METHOD AND APPARATUS FOR PREDICTING LOCATIONS AND SCHEDULES OF LAW ENFORCEMENT TRAFFIC PATROLS

CROSS REFERENCE OF RELATED APPLICATIONS

This patent application claims benefit of Provisional Patent Application No. 61/205,741 filed on Jan. 24, 2009.

BACKGROUND OF THE INVENTION

The present invention relates to electronic devices used to provide information to drivers and more particularly relates to a method and apparatus for utilizing historical data to predict traffic law enforcement patrol locations, speed traps, parking enforcement and road hazards.

It is well known that road condition information is very important to drivers to improve efficiency and safety of travel. In particular it is beneficial to maximize the amount of relevant road information that is available to drivers and present it in an optimally beneficial way. Heretofore, the most common road condition information has been real time and available from radar detectors for locating immediate law enforcement patrol locations, radar detectors equipped with GPS for detecting locations of red light cameras, fixed speed traps and from the Department of Transportation through GPS based vehicle navigation systems for providing real time road condition data.

However, these techniques primarily provide only real time road condition information and do not provide historic and probabilistic or statistical data. More specifically, data available from traditional radar detectors only provides the driver with immediate law enforcement locations with very little warning. Additionally, current generation radar detectors and cell phones equipped with GPS for detecting red light cameras or fixed speed traps only provide fixed location of traffic law enforcement. Additionally, onboard vehicle navigation systems provide only near real time road accident, hazard and condition information. Heretofore, none of the existing driver information apparatus provide the driver with historical statistical and probabilistic data and none predict likely locations of traffic law enforcement, parking meter enforcement patterns, traffic flow or accident information. It is an object of the present invention to provide historic traffic law enforcement patrol information to a user and utilize historic traffic law enforcement information to statistically predict the locations and enforcement profile where users are likely to encounter law enforcement patrols and speed traps.

It is an additional object of the present invention to utilize historic traffic law enforcement patrol citation records to statistically predict the probabilistic locations of traffic law enforcement patrols, enforcement profiles and speed traps.

An additional object of the present invention is to provide historic and probabilistic traffic law enforcement patrol location information and statistically predict the locations where it is more likely to encounter traffic law enforcement, and speed traps and provide maximum safe speeds to avoid citation derived from historical traffic law enforcement data.

It is yet another object of the present invention to utilize historic parking meter law enforcement citation records to statistically predict the probabilistic parking law enforcement patrols and schedules.

It is yet another object of the present invention to utilize historic parking meter law enforcement citation records and preferably current parking meter law enforcement location to statistically predict the probabilistic parking law enforcement patrols and schedules.

An additional object of the present invention is to provide historic and probabilistic parking meter law enforcement patrol location and schedule information and statistically predict parking enforcement schedules and locations.

An additional object of the present invention is to provide a method for providing historical and statistical road hazard condition information to drivers. It is yet another object of the present invention to provide a method for providing historical and statistical accident information to drivers.

SUMMARY OF THE INVENTION

It is a general object of the present invention to provide a method for supplying statistical and historical traffic related data to drivers. It is a more specific object of the present invention to provide a predictive traffic law enforcement profiler apparatus which incorporates a means to determine current location, date and time, speed and also incorporates a means to access a database of historic traffic law enforcement and historical traffic data and also incorporates a predictive processing means to statistically predict likely patrol locations and schedules of traffic law enforcement and traffic hazards and a means to provide this information to the driver. It is yet another object of the present invention to provide a predictive parking meter law enforcement profiler apparatus which incorporates a means to determine current location, date and time and also incorporates a means to access a database of previously issued historical parking law enforcement citations and preferably a means to access a database of known real time locations of parking law enforcement personnel and a predictive processing means to statistically predict likely parking violation enforcement patrol locations and schedules and a means to provide this information to the user. It is yet another object of the present invention to provide a method for predicting the likely locations of traffic law enforcement. It is yet another object of the present invention to provide a method for predicting the maximum driving speeds to avoid a statistically significant chance of receiving a citation for exceeding the speed limit at given locations. It is yet another object of the present invention to provide a method for predicting parking violation enforcement patrol locations and schedules. The present invention provides an innovational design which incorporates state of the art data processing predictive technology to provide precise action, increased accuracy, lower cost, and added functionality over known existing products.

In a preferred embodiment, the predictive traffic law enforcement profiler apparatus includes a location determining means, predictive means, current time and date determining means, a database means, user input means, a predictive processor means and an indicator means. Said location determining means includes a means to determine the latitude and longitude location and current velocity. The time of day determining means includes a means to determine the current date and time. The database means includes a means for storing the locations where traffic law enforcement has historical issued citations and the details surrounding said citations which preferably includes type of violation, direction of travel, speed of vehicle, reason for stop, and type of vehicle. Said predictive processing means correlates current location, speed, time of day, and user criteria with entries in the database to statistically predict the locations where it is more likely to encounter traffic law enforcement, and speed traps and provide maximum safe speeds to avoid citation derived from said database of historical issued citations and provide said information via the indicator means which preferably includes both visual and audible annunciators.

In yet another preferred embodiment, the predictive traffic law enforcement profiler apparatus includes a location determining means, predictive means, time of day determining means, a database means, a predictive processor means and an indicator means. Said location determining means includes a means to determine the current location. The time of day determining means includes a means to determine the current date and time. The database means includes a means for accessing historical entries of traffic law enforcement issued parking meter expired time citations said citation entries preferably include location of parking meter, date, and time of violation. Additionally, the database means preferably includes a means for accessing real time locations of parking meter violation law enforcement personnel. Said predictive processing means correlates current location, time, date and preferably real time locations of parking meter violation law enforcement personnel with entries in the database to statistically predict parking law enforcement patrol routes and schedules and provide said information via the indicator means which preferably includes both visual and audible annunciators.

In yet another preferred embodiment, the predictive law enforcement traffic profiler driver information apparatus also includes a means for monitoring current weather conditions and a database means. The database means includes a means for storing the coordinate locations where accidents have occurred and the recorded details associated with said accidents which preferably includes cause of accident, time of said accident, and weather conditions at time of said accident. In this preferred embodiment, the said predictive processing means correlates current location and current weather conditions with said database to determine relevant locations of probable road hazards via the indictor means which preferably includes both visual and audible annunciators.

Further objects and advantages of the present invention will become apparent to those skilled in the art from a consideration of the following detailed description of the preferred embodiment and drawings.

DESCRIPTION OF DRAWINGS

FIG. 1 Block diagram of predictive traffic law enforcement profiler apparatus FIG. 2 Method for profiling speeding violation traffic law enforcement FIG. 3 Method for profiling parking violation law enforcement FIG. 4 Example display for profiling speed limit violation law enforcement FIG. 5 Example display for profiling parking violation law enforcement

DETAILED DESCRIPTION

It is well known that traffic law enforcement agencies have patrol patterns and schedules that vary by location, time of day, month and year and weather conditions. Additionally, state and city law enforcement agencies maintain databases of traffic violations that were issued, such traffic violations include but are not limited to speeding citations and parking meter citations. Each citation record includes information relevant to the violation. In the case of speeding citations, typically the time, date, location and speed of the vehicle are recorded. In the case of parking meter expired time citations, typically the time, date, and location are recorded. The predictive traffic law enforcement profiler apparatus utilizes databases of arrest, traffic stop, parking meter citation, and traffic citations maintained by law enforcement agencies including state highway patrols and city and county police departments, municipal courts, state courts and in general government or private agencies to profile and predict the locations and schedules where traffic law enforcement agencies patrol. The apparatus provides an indication to a driver when approaching an area where there is a historic or statistically significant chance of encountering traffic law enforcement personnel allowing precaution to be taken such as driving cautiously and within speed limits. Additionally, the apparatus also provides the driver with historically significant information which includes a maximum estimated speed which it is safe to drive without a statistically high chance of being stopped by law enforcement for violating the speed limit. Additionally, the apparatus provides a user an estimated parking meter violation enforcement patrol route map, schedule and an estimated parking meter violation enforcement interval, and estimated patrol times.

A block diagram of the predictive traffic law enforcement profiler apparatus is shown in FIG. 1. As can be seen, the apparatus 14, consists of a predictive processing unit 1, a location determining unit 7, a historical predictive database 2 of traffic law enforcement citations, a road map database 15, a visual display 9, an audible output 8, wireless connection 6, remote databases 3 consisting of historical traffic law enforcement citation database 4 and real time locations of traffic law enforcement 5, and user control 10. FIG. 2 presents the method 212 for profiling moving traffic law enforcement patrols, and FIG. 3 presents the method 309 for profiling parking law enforcement patrols. Methods 212 and 309 could be implemented on the predictive traffic law enforcement profiler apparatus 14. The apparatus 14 could be implemented as a stand alone device specifically built for this application or the apparatus 14 could be integrated into portable navigation devices such as a TomTom, Garmin, Nuvi or similar road navigation device in which case this apparatus 14 and methods 212 and 309 could be integrated within the device and use the common resources of the device. The apparatus 14 could further be integrated as content in the portable navigation device database. Additionally, the methods 212, 309 and apparatus 14 could be integrated into a cellular telephone device such as the Apple iPhone, Google phone, Droid, Palm or similar cellular device in which case methods 212, 309 could be an application running on said device and utilizing and sharing resources on said device possibly including processor, memory, GPS, wireless connection and display resources. As can be seen in FIG. 1, The Predictive Processing Unit 1 accepts input from the User Control 10, location determining unit 7, Weather Monitor 11, and database 2 and 3. The Predictive Processing Unit 1 provides annunciation output to the Speaker 8 and Display 9 and also may have connectivity to a USB 12, wireless or other similar interface 6 for uploading updated databases as well as downloading stored data. The Predictive Processing Unit (PPU) 1 accepts input from the Location Determining unit 7 which also provides the current location, speed, direction of travel, date and time. The location determining unit 7 could be realized using Global Positioning (GPS) technology and it is well known that speed, direction of travel, date, and time can be derived from GPS data. Utilizing the current position, time of day, speed and direction of travel provided by the Location Determining Unit 7, the PPU 1 accesses the historical database of traffic law enforcement citations 2, 4, and real time database 5 of current traffic law enforcement locations, and statistically profiles and predicts the locations, schedules and enforcement pattern of traffic law enforcement patrols. Additionally the PPU 1 provides a visual representation of the historical and predicted traffic law enforcement profile to the display 9 and can also provide an acoustic representation of said historical and predicted traffic law enforcement profile information to the speaker 8.

The databases 2, and 4 preferably contain historical records derived from citations which were issued by traffic law enforcement agencies. Said records are considered public information and are compiled and maintained by law enforcement and government agencies and said agencies preferably include but are not limited to State Highway Patrols, City and County Police agencies, Department of Motor Vehicles and Municipal Courts. Preferably databases 2 and 4 contain an entry for each citation which was issued. Each entry of databases 2, 4 preferably contain the following fields—location, time and date of issue, direction of travel, violation type, and speed if entry is for speeding violation. Equation 1, demonstrates a possible format representation of each entry in database 2, 4.

citation_entry={location,time,date,direction, violation_type,speed}

Equation 1. Citation Database Entry Format.

Said location field is preferably in GPS latitude and longitude units; however, it may be reported by mile post marker, parking meter location, or street address. Said time and date are preferably in local time zone. Said direction is preferably North, South, West or East. Said violation_type is preferably speeding or parking. Said speed is preferably recorded as a number representing the speed of the vehicle when a speeding citation was issued.

Databases 2, 4, 15 preferably also contain entries of traffic flow volume for roadway locations. Said traffic flow volume entries are shown in Equation 2.

traffic_flow_volume_entry={location,volume,time}

Equation 2. Traffic Flow Volume Entry Format

Said location field is preferably in GPS latitude and longitude units.

Additionally, the location of each citation can be weighted by traffic flow volume at the location where the citation was issued to enable more accurate computation of the probability of being stopped for speeding, such traffic flow volume databases are collected and typically maintained and updated by government agencies. More specifically, if there is a relatively high volume of traffic and a relatively low number of traffic citations issued at a given location, then this indicates there is a lower probability of a given driver being stopped by traffic law enforcement in that area. However, if there is a relatively low volume of traffic and a relatively high number of traffic citations issued at a given location, then this indicates there is a higher probability of a given driver being stopped by traffic law enforcement in that area and could possibly be considered a speed trap.

Databases 2, 4 preferably also contain entries for mapping Mile Post Marker to GPS latitude and longitude coordinates, parking meter number to GPS latitude and longitude coordinates, and street address to GPS latitude and longitude.

gps_coordinate={location by mile post,parking meter number,street address,lat-long}

Equation 3. Mile Post, Address, Parking Meter Location to GPS Latitude and Longitude Entry Format FIG. 2 shows a possible method 212, for profiling traffic law enforcement. The preferred objective of method 212 is to predict likely traffic law enforcement patrol locations, schedules, speed traps and maximum speed to avoid citation. The method 212 would preferably be implemented by the traffic law enforcement profiler apparatus 14. The first operation 201 determines current location in GPS coordinates, time, date, direction and speed from the location determining unit 7. The next operation 202 determines the geographical region of interest which preferably results in GPS coordinates defining the boundaries of the region. The next operation 203, utilizes the GPS coordinates for the region of interest determined in step 202, to access the historical databases 2, 4, 15 and real time database 5 to retrieve said citation entries Equation 1, for the region of interest, henceforth referred to as database entry (dbe). Using said dbe retrieved in step 203, predicted traffic law enforcement patrol locations are computed in operation 204, predicted traffic law enforcement schedules are computed in operation 205 and the speed limit enforcement profile to provide maximum estimated speed to avoid significant probability of citation is computed in operation 206. Operations 204, 205, 206 process the historical data base entries provided by step 203 to produce statistical estimates of past patrol locations in operation 204, estimates of schedules in operation 205 and enforcement profiles in operation 206, and time extrapolate statistical estimates to produce predicted patrol locations in 204, schedules in 205 and enforcement profiles in 206 as a function of time and location. Additionally, the predicted patrol schedules 213 are provided to operation 208 which determines if the location of the apparatus provided by operation 7 is approaching the predicted patrol locations 213 with relatively high patrol time and location correlation which indicates a likely location to encounter traffic law enforcement or speed traps. Additionally, operation 208 can signal operation 210 to issue an audio or visual alarm. The predicted enforcement speed limit 214 determined by 206 can be provided to operation 209. Operation 209 can determine if the apparatus 14 has a velocity determined by operation 7, which is faster than the predicted enforcement speed limit 214 and issue an alarm by notifying operation 211.

Operation 204 computes the accumulation of speeding citations retrieved from database 2 and 4 as a function of time and location and an example algorithm is shown equation 4.

$$\text{accumulation}(loc) = \sum_{t=t1}^{t=t2} dbe(loc, t)$$

Equation 4. Computation of Speeding Citation Location Accumulation.

The following terms of equation 4 are defined:

Accumulation(loc)—total occurrences of citations at a given location loc.

Loc—location dbe(loc,t)—data base entry at a specific time and location.

t—time t1—start time and date of interval for calculating the total number of citations t2—end time and date of interval for calculating the total number of citations Equation 4 computes the total number of occurrences of citations issued at a given location loc within a specified time period t1 to t2 referred to as citation accumulation. Operation 204 computes the citation location accumulation for each location provided by operation 203 to produce a complete histogram of citation accumulations at each location loc. Preferably the time period t1 to t2 is large enough to give an accurate representation of issued citations at a given loc, said period t1 to t2 being preferably in the range of 1 day to 1 year. Said citation accumulation results of operation 204 are passed to operation 207.

Operation 205 computes the time-location correlation of speeding citations retrieved from database 2 and 4 which predicts patrol schedules and an example algorithm is shown in equation 5.

$$\text{correlation}(loc + \Delta a, \Delta t) = \sum_{n=n\,min}^{n\,max} dbe(loc + \Delta a, n\Delta t + \Delta \varepsilon)$$

Equation 5. Computation of Citation Location-Time Correlation.

The following terms of equation 5 are defined:

correlation(loc, Δt) the total correlation of citation locations at periodic times Δt Loc+Δα—location of said violation within +/−Δα distance, Δα preferably ranges from 100 feet to 10 miles.

dbe(loc, nΔt+Δϵ)—represents a database entry which has a matching location loc and issue time nΔt+Δϵ.

Nmin—the earliest index for calculating correlation time duration.

Nmax—the last index for calculating correlation time duration.

Loc+Δα—location of said violation within +/−Δα distance, Δα preferably ranges from 100 feet to 10 miles.

nt+Δϵ—time of said violation within +/−Δϵ time, Δϵ preferably ranges from 1 minute to 1 day.

Equation 5 computes the total number of periodic occurrences of citations issued at a given location loc at the periodic times starting at time nmin*Δt+Δϵ. to nmax*Δt+Δϵ. This is accomplished by accessing the database dbe and counting the number of entries with matching loc and time n*Δt+Δϵ. The occurrence of each matching dbe preferably has a weight of one. Said periodic times n*Δt+Δϵ have a Δϵ term added which functions to allow a dbe with matching loc and in the span of +/−ϵ to match. Δϵ preferably has a span of 1 minute to 1 hour such that any dbe with a matching location loc, and issue time nΔt within the said span Δϵwill produce a positive match result. Operation 205 repeats Equation 5 for each location provided by operation 202. Operation 205 preferably repeats equation 5 for different time spacing intervals Δt preferably ranging from one hour to one year. Said citation location-time correlation results of operation 205 are passed to operation 207.

Operation 206 computes the speed limit traffic law enforcement profile. Utilizing the database entries provided by operation 203, operation 206 computes the mean citation speed and an example algorithm is shown in equation 6. Operation 206 also computes the citation speed variance and an example algorithm is shown in equation 7. Additionally, Operation 206 also compute the minimum citation speed for each location and an example algorithm is shown in equation 8. Equation 6 presents the algorithm for computing the mean citation speed as a function of time and location which represents the average speed at which speeding citations were issued at a given location loc and time t.

$$\text{mean\_citation\_speed}(loc, t) = 1/N \sum_{matching} dbe.\text{speed}(loc + \Delta a, t + \Delta \varepsilon)$$

Equation 6. Computation of Mean Citation Speed.

The following terms of Equation 6 are defined:

Dbe.speed—represents database entry citation speed for which the speeding citation was issued.

Loc+Δα—location of said violation within +/−Δα distance, Δα preferably ranges from 100 feet to 10 miles.

T+Δϵ—time of said violation within +/−Δϵ time, Δϵ preferably ranges from 1 minute to 1 day.

1/N—N is the total number of dbe entries which match at said location and time

Equation 7 presents an algorithm for computing the citation speed variance as a function of location loc and time t on the database entries dbe provided by operation 203. Said variance represents the variability and uncertainty in said speed limit traffic law enforcement profile. Said citation variance results of operation 206 are passed to operation 207.

citation_speed_variance(loc,*t*)=1/*N*Σ(dbe.speed(loc+Δα,*t*+Δϵ)−mean_citation_speed(loc,*t*))**2

Equation 7. Computation of Citation Speed Variance as a Function of Location and Time.

Citation_speed_variance—variance of violation speed for which citations were issued at the specified location and time.

dbe.speed—database entry violation speed at the specified location and time.

Loc+Δα—location of said violation within +/−Δα distance, Δα preferably ranges from 100 feet to 10 miles.

T+Δϵ—time of said violation within +/−Δϵ time, Δϵ preferably ranges from 1 minute to 1 day.

1/N—N is the total number of dbe entries which match at said location and time

Equation 8 presents an algorithm for determining the minimum speed at which a speeding citation was issued as a function location loc and time t. Said minimum speed provides an indication of the maximum speed to avoid receiving a citation.

min_citation_speed(loc,*t*)=floor(dbe.speed(loc+Δα,*t*+Δϵ))

Equation 8. Computation of Minimum Citation Speed.

Min_citation_speed—minimum violation speed for which a citation has been issued at the specified location and time.

dbe.speed—database entry violation speed at the specified location and time.

Loc+Δα—location of said violation within +/−Δα distance, Δα preferably ranges from 100 feet to 10 miles.

T+Δϵ—time of said violation within +/−Δϵ time, Δϵ preferably ranges from 1 minute to 1 day.

In equation 8, the floor function accesses all dbe entries provided by operation 203 and extracts the lowest speed field from the set of dbe entries. Said minimum citation speed results of operation 206 are passed to operation 207.

Operation 207 accepts citation location accumulation results from operation 204, citation time-location correlation results from operation 205, and citation speed mean, variance and minimum from operation 206 and roadway map database entries from 203 and speed, date, time, location data from Location Determining Unit 7 to produce a visual representation of roadway map with traffic law enforcement profile information symbology overlay as shown in FIG. 4 on display 9.

FIG. 4 contains an example representative view 64 of the display 9 produced by operation 207. The view 64 shows a map of the roadway 50, 59, and 58. Overlaid on the roadway 50, is preferably the current location of the user 62, in addition to the current velocity and time 63 of the user 62. Overlaid on the roadway 50 are indications 51, 54, and 57 showing the mean speed that traffic law enforcement has issued citations for speeding which where were calculated by the speed limit enforcement profiler 206. Additionally, markers 52, 53, 55 and 56 show citation accumulation data computed by the Patrol Location Estimator 204, which marks the location where traffic law enforcement issued citations and hence patrol locations. Further, the Patrol Location Estimator 204 identifies the location 55 of a speed trap, which is indicated by a regional increase in the citation location accumulation computed by operation 204, such an increase could be an increase of 4 times the citation location accumulation in a given 1 mile area over surrounding 1 mile areas. Information box 64 provides an example of estimated traffic law enforcement patrol schedule computed by the location time correlation operation 205. Estimated patrol schedule information box 64 preferably provides estimated patrol times, locations, average speed at which citations were issued, citation variance from the mean, and the minimum speed for which a speeding violation was issued. Preferably the display 64 also provides the estimated patrol schedule computed by operation 205 and the speed limit enforcement profile computed by operation 206 at the location of the user 62 in information box 60.

The speed limit enforcement profile computed by 206 can preferably be used in conjunction with road trip planning to plan a trip route with the fastest driving speeds.

The view 64 is an example of one realization to present the traffic law enforcement profiled information, and many alterations of the above description are possible but still within the scope of the current invention.

FIG. 3 shows a possible method 309, for profiling parking violation law enforcement locations and schedules. The preferred objective of method 309 is to predict likely parking law enforcement patrol locations, patterns and schedules. The method 309 would preferably be implemented by the traffic law enforcement profiler apparatus 14. The first operation 301 determines the current location preferably in GPS coordinates, time, date, and direction from the location determining unit 7 provides said location, time, date and direction through interface 319 to region of interest determining operation 302. Using input from the User Control 10 and the location, time, date, and direction determined by 301, operation 302 determines the geographical region of interest which preferably results in GPS coordinates defining the region of interest boundaries for which parking violation law enforcement will be profiled and provides said region of interest boundaries on interface 310, such region is preferably a rectangular region surrounding current location and extending 100 feet to preferably less than 3000 miles as defined by user control 10. Region of interest boundaries 310, are utilized by operation 303 to access historical predictive databases 2,4, real time database 5, roadway map database 14 and retrieve regional database entries which fall within region of interest 310 and provide regional database entries to patrol location profiler 305, patrol schedule profiler 306, and operation 307 which produces a visual representation of roadway parking map with parking law enforcement profile information symbology overlayed as shown in FIG. 5 on display 9.

Operation 305 computes the parking enforcement patrol profile for each location in region 310 using the historical database entries 317 retrieved by operation 303. Operation 305 additionally can predict the parking profile for each location in region 310 by time extrapolation of the parking enforcement patrol profile. The parking patrol profile preferably consists of determining the following statistics for each location in region 310:

1) Absolute earliest daily parking enforcement patrol.
2) Absolute latest daily parking enforcement patrol.
3) Mean patrol interval and patrol interval variance
4) Histogram of parking enforcement patrol schedule.
5) Mean time and variance of parking enforcement patrols.

Operation 305 computes the absolute earliest daily parking enforcement patrol time for each location in region 310 possibly using an example method shown below:

Extract database entries for location loc from historical database of entries 317 to form a new subset of database entries organized as an array dbe_loc[n] of database entries of length N and sorted by time and date—earliest to most recent such that dbe_loc[0] is the oldest citation record and dbe_loc[N−1] is the most recent.

Stated in mathematical form:

Dbe_loc[N]=dbe entries 317 with matching loc, number of entries is N. Sort dbe_loc[N] using time, and date. Sort oldest to newest. Search each entry dbe_loc[N] and find entry with earliest time.

Index each entry of said dbe_loc[n] array and record the entry with the earliest issued time. Said time will be the absolute earliest daily parking enforcement patrol time.

Operation 305 computes the absolute latest daily parking enforcement patrol time for each location in region 310 possibly using the method shown below:

Index each entry of said dbe_loc[n] array and record the entry with the latest issued time. Said time will be the absolute earliest daily parking enforcement patrol time.

Furthermore, operation 305 can preferably compute said absolute earliest and latest times for each individual day of the week since patrol schedules may be vary by the day of the week.

Operation 305 computes the patrol interval and variance of parking enforcement patrols for each location in region 310 preferably by differencing the time between temporally sequential dbe entries with matching location and date to produce a series of patrol intervals for each day. The mean patrol interval can be computed for each individual day of the week by averaging said series of patrol intervals with intervals computed similarly for the same day of the week but with different dates. Thus, since parking law enforcement patrols can vary for each day of the week, patrol interval patterns can be estimated for each day of the week.

To provide a measure of predictability, operation 305 also computes the variance of parking enforcement patrol intervals for each location in region 310 preferably by differencing the dbe patrol time from previously computed said mean patrol interval for each location and then squaring the difference to produce a squared difference term and then averaging the sum of the squared difference terms to produce said variance of parking enforcement patrol intervals.

Additionally, Operation 305 preferably computes the histogram of parking law enforcement schedules for each day of the week for each location in region 310 preferably by accumulating dbe entries with matching location and day of the week. The time field associated with each matching dbe is then plotted on a linear time scale. The composite plotting of matching dbe time entries forms a histogram which conveys average patrol schedules and time variance of patrol schedules. Operation 305 can predict parking enforcement patrol schedule and interval, by time extrapolating the histogram of parking enforcement patrol schedule and estimated patrol intervals.

Operation 306 computes the predicted parking law enforcement patrol route. The predicted patrol route can be computed by differencing the time between temporally sequential dbe with matching dates. The difference between the dbe locations provides a direction and the locations for each dbe entry provides the route path. Preferably, said directions and route path can be computed for multiple days which would preferably be greater than 1 but less than 365, and said computed directions and route paths can combined to form a composite parking law enforcement patrol route 314. Said composite parking law enforcement patrol route results of operation 306 are passed to operation 307.

Operation 307 accepts absolute earliest and latest daily parking enforcement patrol times, mean patrol interval and patrol interval variance, and a histogram of parking enforcement patrol schedules from 305, and a composite parking law enforcement patrol route from operation 306, and roadway map database entries from 303, and date, time, location data from Location Determining Unit 7 to produce a visual representation of roadway map with parking law enforcement profile information symbology overlay as shown in FIG. 5 on display 443.

FIG. 5 contains an example representative view 443 of the display 9 produced by operation 307. The view 443 show a map of the roadway 420, 421, and 422. Preferably superimposed on the roadway 422 is a symbol 441 indicating the current location of the user. Superimposed on the roadway are indicator arrows 400, 401, 402, 403, 404, 405, 406, 407, 408 which specify the estimated traffic law enforcement route determined by 306. Additionally, view 443 preferably contains information boxes 430, 432 which show estimated parking enforcement patrol intervals and schedules at various locations. The parking information statistic boxes 430, 432 preferably contain the estimated patrol interval, estimated patrol schedule, and the earliest and latest patrol times. Preferably the view 443 contains an additional information box for the current position of the user 431 which specifies the parking law enforcement profile at the location of the user 441. Additionally, the view 443 preferably provides a histogram view 433 of the parking enforcement profile as computed by operation 305. The view 443 preferably displays the location of the optimum parking spot 444, which has the lowest number of citations issued.

Operation 308 provides a means for operation 307 to signal an acoustic or visual alarm.

While the above description contains many specifics, these should not be construed as limitations on the scope of the invention, but rather as an exemplification of one preferred embodiment thereof. It will be obvious to those skilled in the art that many modifications and alterations may be made without departing from the spirit and scope of the invention which should be determined not by the embodiments illustrated, but by the appended claims and their legal equivalents.

What is claimed is:

1. An apparatus for predicting the patrol patterns, locations and schedules of traffic law enforcement comprising: a location determining means for providing the current location of said apparatus; a velocity determining means for determining the current velocity of said apparatus; current time and date determining means, a database means for storing historical records of issued traffic law enforcement citations, said database means containing location, violation speed, type, date and time of each said issued traffic law enforcement citation; a map database means for storing a map of the roadway system; a predictive processing means to cross correlate said time, and location of said issued traffic law enforcement citations to predict patrol patterns, locations and schedules of said traffic law enforcement; a display means to present a view of the roadway from said map database means; a further display means to present said violation speed, type, date, time and location of said issued traffic law enforcement citations; a further display means to present said predicted patrol patterns, locations and schedules of traffic law enforcement; an alert means to notify when said predictive processing means determines said apparatus is within said predicted patrol patterns, locations, and schedules of said traffic law enforcement.

2. Apparatus of claim 1 further comprising a police radar and laser speed detector.

3. Apparatus of claim 1 further comprising a vehicle navigation system.

4. Apparatus of claim 1 further comprising a cellular telephone.

5. Apparatus of claim 1 further comprising an enforcement speed determining means for calculating average of said violation speed of said issued traffic law enforcement citations at a said location.

6. Apparatus of claim 1 further comprising a route calculating means to determine the fastest route from the possible routes between a source and a destination; said route calculating means utilizing the average said violation speed of said issued traffic law enforcement citations at each said location of said route.

7. An apparatus for predicting the patrol routes, schedules, locations, and enforcement speed of traffic law enforcement comprising: a historical record of issued traffic law enforcement citations wherein said historical record includes date, time, location, violation type, and violation speed of each said issued traffic law enforcement citation; a patrol route and schedule estimate means to compute the cross correlation of said time of said issued traffic law enforcement citations at a said location; a patrol location estimate means to compute the accumulation of said locations of said issued traffic law enforcement citations; a patrol enforcement speed estimate means to compute the average and minimum of said violation speed of said issued traffic law enforcement citations at a said location; time extrapolating means to predict said patrol routes, schedules, locations and enforcement speed from said patrol route and schedule estimate, said patrol location estimate, and said patrol enforcement speed estimate; a display means to present said predicted patrol route and schedule, location and enforcement speed.

8. Apparatus of claim 7 further comprising a police radar and laser speed detector.

9. Apparatus of claim 7 further comprising a vehicle navigation system.

10. Apparatus of claim 7 further comprising a cellular telephone.

11. Apparatus of claim 7 further comprising a route calculating means to determine the fastest route from the possible routes between a source and a destination; said route calculating means, computing said fast route from the average said violation speed of said issued traffic law enforcement citations at each said location of said route.

12. A method for predicting the patrol routes, schedules, locations, and enforcement speed of traffic law enforcement which comprises the steps of: Retrieving a historical record of date, time, location and violation speed of each issued traffic law enforcement citation; predicting said patrol route and schedule by time extrapolating the cross correlation between said time of said issued traffic law enforcement citations at a said location; predicting said patrol location as the accumulation of said locations of said issued traffic law enforcement citations; predicting said enforcement speed as the average and minimum said violations speed of said issued law enforcement citations at a said location.

13. An apparatus for predicting the patrol intervals, routes, locations and schedules of parking law enforcement comprising: a historical record of issued parking law enforcement citations wherein said historical record includes date, time, and location of each said issued parking law enforcement citation; a patrol interval estimate means to compute the average of the minimum said time between said issued parking citations at a said location; a patrol route estimate means to compute said locations of said issued parking citation which are time sequential; a patrol location estimate means to accumulate said issued parking citations location; a patrol schedule estimate means to compute cross correlation of said time of said issued parking citations at a said location; a predicting means to time extrapolate said patrol interval, location, route and schedule estimates; a display means to present a map of the roadway and said predicted patrol interval, location, route, and schedule.

14. Apparatus of claim 13 further comprising a location determining means, a time and date determining means; a further processing means to provide said predicted patrol intervals, routes, locations and schedules at said location and said time and date.

15. Apparatus of claim 13 further comprising a parking location calculating means to determine the least patrolled parking location from possible parking locations; said least patrolled parking location being calculated as that having the lowest said patrol location estimate and the longest said patrol interval estimate.

16. Apparatus of claim 13 further comprising a parking meter fee database means for providing parking rates at said locations.

17. Apparatus of claim 13 further comprising a vehicle navigation system.

18. Apparatus of claim 13 further comprising a cellular telephone.

19. Apparatus of claim 13 further comprising a database means containing locations of real time parking law enforcement personnel; a display means for presenting locations of said real time parking law enforcement; a predicting means for predicting patrol route and schedule of said real time parking law enforcement by time extrapolating said patrol interval, location, route and schedule estimates.

20. A method for predicting patrol intervals, routes, locations and schedules of parking law enforcement which comprises the steps of: Retrieving a historical record of issued parking law enforcement citations wherein said historical record includes date, time, and location of each said issued parking law enforcement citation; estimating said patrol intervals as the average of the minimum time difference between said issued parking citations at a said location; estimating said patrol routes from said locations of said issued parking citations which are time sequential; estimating said patrol locations from said issued parking citations location; estimating said patrol schedules by cross correlating said time of said issued parking citations at said location; predicting said patrol intervals, routes, locations and schedules of said parking law enforcement by time extrapolating said patrol interval, location, route and schedule estimates.

21. Method of claim 20 further comprising the steps for determining an optimal parking location as determine locations of optional parking; determine current location, time and desired parking duration; determine parking meter location with longest said patrol interval estimate at said current time and said patrol schedule estimate which does not overlap said current time and said desired parking duration.

* * * * *